Figures 1, 2:
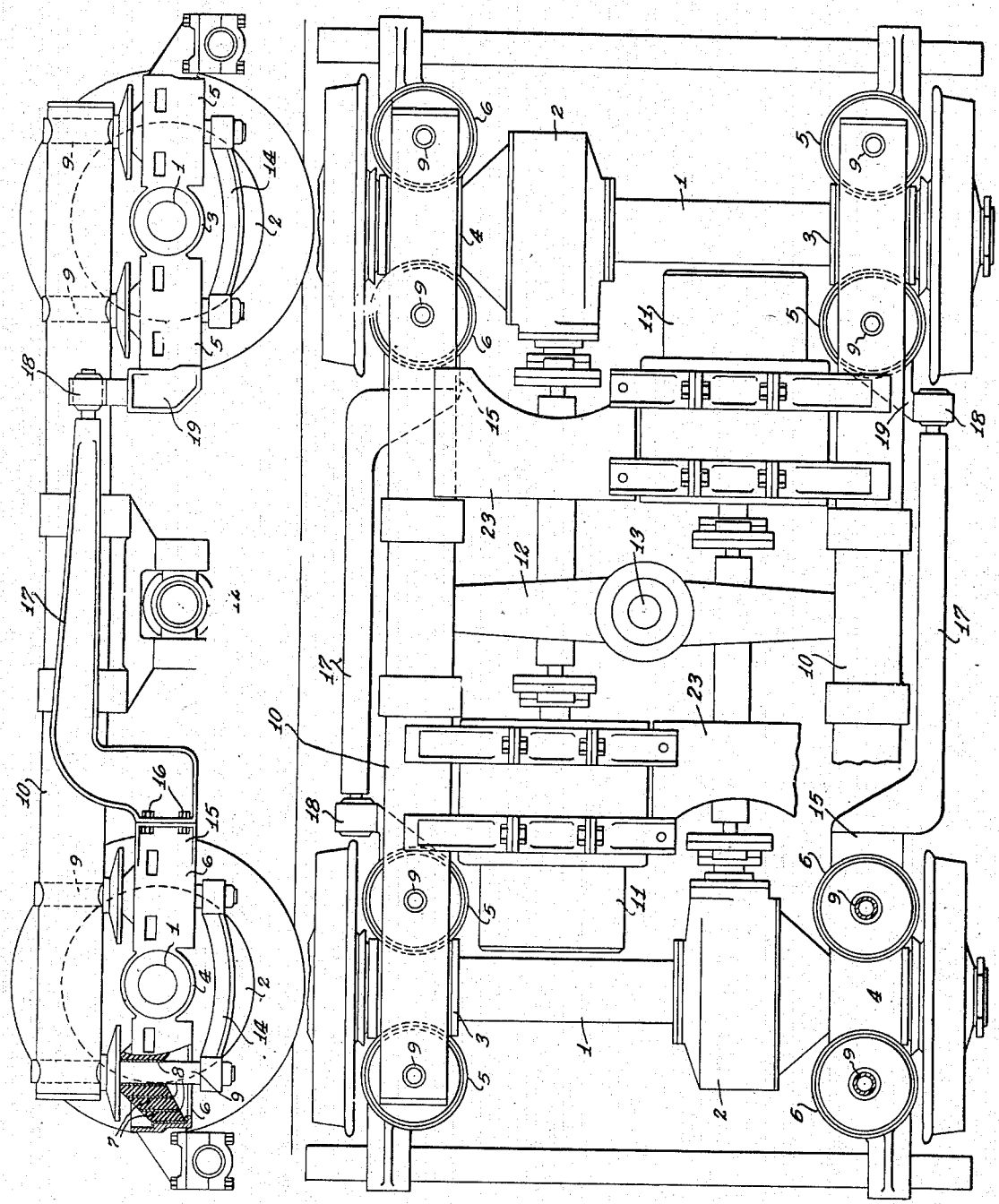

June 3, 1941.  E. H. PIRON  2,244,502

RAIL TRUCK

Filed May 31, 1935  2 Sheets-Sheet 1

INVENTOR.
Emil H. Piron

BY Windsor Davis

ATTORNEY.

June 3, 1941.   E. H. PIRON   2,244,502
RAIL TRUCK
Filed May 31, 1935   2 Sheets-Sheet 2

INVENTOR.
Emil H. Piron
BY
ATTORNEY.

Patented June 3, 1941

2,244,502

UNITED STATES PATENT OFFICE 2,244,502

RAIL TRUCK

Emil H. Piron, New York, N. Y., assignor, by mesne assignments, to Transit Research Corporation, New York, N. Y., a corporation of New York Application May 31, 1935, Serial No. 24,190

22 Claims. (Cl. 105—135)

This invention relates to rail trucks and has for its object to provide a truck capable of giving improved riding qualities in a simpler and more economical construction, and which is capable of performing all functions with the use of a single set of springs associated with the journal bearings.

In standard truck construction the mass of the truck is supported by journal springs and, in turn, supports bolster springs, bolster and car body. With such an arrangement the mass of the truck being located vertically between two systems of springs, the journal springs below and the bolster springs above, has both a low and a high natural frequency of oscillation. Theoretically, this constitutes a double spring and mass system, i. e. a system comprising successively a spring, supporting a mass, supporting a second spring, supporting a second mass. It can be shown that such a system has two natural frequencies of oscillation for the first and also for the second mass. One of these frequencies, the low frequency, is approximately the same as that of one mass supported by one system of springs having the same resiliency as the two spring systems in series. The other, the high frequency, is of a higher order. For instance, in practical design, the two spring systems of a standard truck, journal and bolster spring systems, are such that if the two spring systems are put in series, one on top of the other, and, (a) if the body is put on top of them, without the addition of the mass of the truck in between, the natural frequency of vertical oscillation is approximately two cycles per second, but: (b) if the mass of the truck is added to the mass of the body, this frequency becomes for instance 1.9 cycles per second, and, (c) if the mass of the truck is added between the two systems of springs, 2 frequencies appear, one frequency of 2.05 cycles per second and one of 10 cycles per second. Considering that high frequency vibrations are one of the main factors giving the impression of a hard riding quality and causing dislocation and wear in truck and body, it is seen how important it is to avoid any combination having natural response to such frequencies.

If the frequency of ten cycles per second were not there to encite the higher natural frequency of the floor, the floor would not be caused to vibrate, as demonstrated by the surprising quietness of the floor of a car equipped with trucks built according to the present invention. It is therefore a principal object of this invention to provide a springing system in which the high frequency vibrations are eliminated.

Another principal object is to provide a torque resisting means capable of absorbing the torque without the transmission of impulses due to variations in value thereof to the spring truck frame or to the car body thereabove, and which will not be subject to the oscillations of the spring frame and car body.

More specifically, it is an object to provide a rail truck frame composed of side rails with the axle housing serving as cross members, and to employ the side rails as torque arms in such manner that the torque arm of each axle housing is maintained in position by the other axle housing. As will be hereinafter seen, the torque is thus absorbed by transfer around the frame without affecting the spring masses thereabove.

It is a further object to provide a so-called "non-clearance" truck wherein the axles are retained against free axial sliding movement in their bearings and in which the said bearings are incapable of free vertical movement with respect to the truck frame, and to impart to this non-clearance truck such flexibility that the axles may be moved relatively vertically or either end of either axle may be elevated or depressed with respect to the other end of either axle to allow the wheels to follow track irregularities without undue deflection of the assembled parts. As will be hereinafter explained, I accomplish this by articulating the side rails of the main frame in such manner that the hinge points are offset from each other in a horizontal longitudinal direction but the side rails are symmetric with respect to each other.

Another object is to provide an improved journal bearing assembly including the bearing proper integrally connected with the casings of my improved springs, which are described in my copending applications Serial Numbers 23,046 and 23,047, both filed on May 23, 1935, and which have since matured into U. S. Letters Patent No. 2,069,270 granted Feb. 2, 1937, and No. 2,137,543, granted Nov. 22, 1938, and to teach the preferred manner of associating my improved torque arms therewith to constitute the main truck frame.

A further object is to provide a secondary frame for use with the above described main frame as a dual frame construction, the secondary frame including the motors and swing bolster and being sprung from the main frame through my improved springs.

It is a specific object to arrange the journal bearings and journal springs in such manner that the main and secondary frames may be readily disassembled, and with the journal bearing assemblies readily removable also from both frames.

Figure 3:
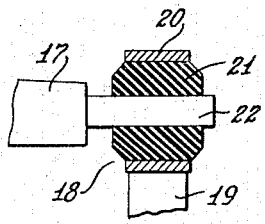
Figure 4:
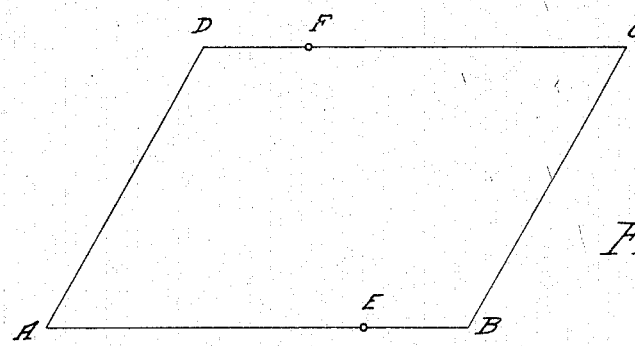
Figure 5:
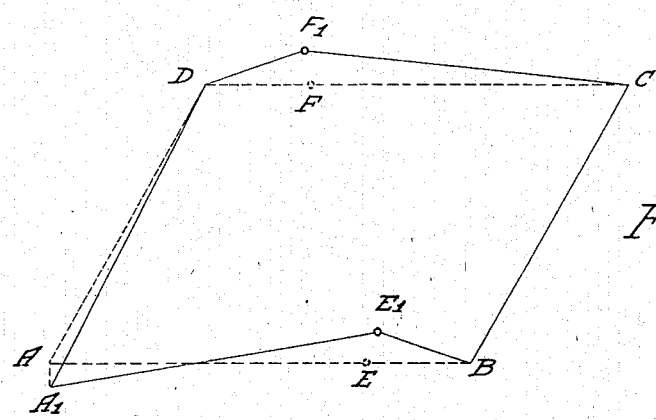
Figure 6:
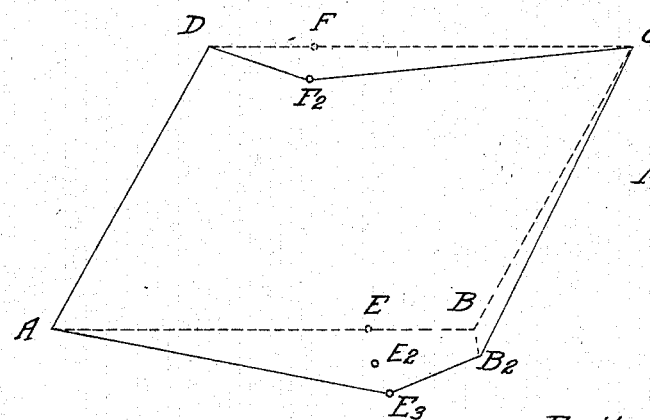

Other objects and advantages will become hereinafter more fully apparent as reference is had to the accompanying drawings wherein my invention is illustrated, by way of example and in which Figure 1 is a side elevation of my improved truck with the journal springs of one axle being shown in section, and Figure 2 is a plan view of the truck of Figure 1 with one side girder partially broken away, Figure 3 is an enlarged detail of the torque arm articulation, and Figures 4, 5 and 6 are diagrams for explanatory purposes.

More particularly, 1 indicates an axle housing having a gear case 2. Fixedly attached to the housing 1 at one end is a journal bearing housing 3 and fixedly attached to the gear case 2 is a journal bearing housing 4. Integral with each housing 3 are two journal spring retaining cylinders 5 and integral with each housing 4 are two similar cylinders 6. In each cylinder 5, 6 are alternate concentric cylindrical layers of rubber 7 and metal 8 comprising journal springs. The retainers 5, 6 act as static-load receiving members and the shafts 9 extend axially through each spring 7, 8 and are the static-load imposing members. These shafts 9 are integrally secured to the frame side girder 10 on which the motors 11 and swing bolster 12 with its center pin member 13 are directly supported. The lower ends of the shafts 9 are attached together by means of the removable straps 14 in order to increase the rigidity of the journal bearing assembly.

A flange or bracket member 15 integral with the retainers 6 is secured, as by the bolts 16 to an elongated torque arm 17 and this arm 17 is connected by a universal joint 18 to a relatively short torque arm 19 fixedly secured to the retainers 5. The retainers 5, 5 and 6, 6 are respectively diagonally opposite each other with the result that a long arm 17 is laterally opposite a short arm 19. The universal joint 18 may be of any suitable construction but is preferably of the type wherein a cylindrical housing 20 rigid with one arm 19 has a cylindrical mass of rubber 21 therein and the arm 17 has a reduced end portion 22 to fit thereinto.

This truck may now be viewed in several ways. Thus, the axle housings 1, the case 2, the journal members 3, 4, 5 and 6, and the torque arms 17, 18, 19 may be considered as the main truck frame which is unsprung. In this case the side girders 10, motors 11, cross rails 23 and swing bolster 12, 13 constitute a secondary frame sprung from the journal springs 5, 6, 7, 8 and 9.

Another way of viewing this truck is that the articulated torque arms are simply rigidly connected at each end to the axle housings or journal bearing housing with the frame sprung above the axles whereby oscillations due to change in torque are not transmitted to the frame.

In order that the invention may be better understood, suppose, Figure 4, that the rectangle ABCD is a frame entirely rigid except for a ball joint articulation at E and F, and suppose that AE, BC, CF and DA=54 inches each in length and that EB and DF=18 inches. When AD and BC are parallel the entire figure is located in one plane.

Now suppose that one of the points A, B, C or D drops down two inches, which is probably the maximum drop of a rail with respect to the other three points and within the wheel base of a truck. Assume first that the distortion takes place at A. The result will be as shown in Figure 5. Computations will show that E has moved a distance of ¼ inch in going to $E_1$ and that F has moved through a distance of ¾ inch in going to $F_1$.

If we now assume that the point B drops down two inches to $B_2$, with the remaining points remaining in a horizontal plane as illustrated in Figure 6, computation will show that in this case also the point E has travelled through ¼ inch in going from the point $E_2$ to the point $E_3$ and that the point F has moved through ¾ inch in going to the point $F_2$.

A drop of the corner D with respect to the corners A, B and C produces a distortion symmetrical to that caused by the drop of the corner B and a drop of the corner C produces a distortion symmetrical to that caused by the drop of the corner A.

In the actual frame the points A, B, C and D are the centers of support of the journal springs 7, 8. The springs are in pairs and symmetrically arranged so that rotation of the retainers 5, 6 about their axles does not affect the total vertical reaction of any of these pairs of springs, at least as long as such rotation remains sufficiently small. The effect is only to transfer part of the load from one spring of a pair to the other.

The frame of a truck in service is affected by various impulses which cause it to oscillate. One kind of impulse is produced by the drop of the center of support of one set of journal springs with respect to another, an effect which exists in any truck equipped with journal springs. However, with standard designs in which the springing is distributed between journal and bolster springs, the journal springs are relatively stiff and the drop of one wheel produces a relatively great release of the compression of the corresponding journal springs and develops a comparatively strong impulse on the corresponding corner of the truck, whereas in the design described herein, with all the springs of the truck concentrated at the journals, the journal springs are comparatively much softer (about three times) and the same drop of one wheel produces a relatively slight release of the compression of the corresponding journal spring and develops a comparatively soft impulse on the corresponding corner of the truck.

Another kind of impulse is produced by the action of the torque arm. In standard designs, in which the reaction of the torque arm is taken by the mass of the truck, any change in torque reaction is an impulse affecting the truck, whereas in the design described herein the torque reaction is taken directly by the corresponding journal and wheel of the other axle only, without affecting the mass of the truck on which the body rests.

What I claim is:

1. The combination of a main truck frame comprising axle housings, and members connecting said housings, each of said members being composed of two articulated parts with the outer ends thereof rigidly secured to said housings to constitute torque arms for both of said housings, a secondary frame comprising side rails and supporting a pair of motors, a swing bolster swung from said secondary frame and carrying a center pin member, and springs for supporting said secondary frame from said main frame.

2. The combination of a main truck frame comprising axle housings, journal bearing housings rigid with the ends of each of said housings, members connecting the journal bearing housings on each side of the truck, each of said members being composed of two parts of unequal length articulated together and rigid with their respective journal bearing housings thereby constituting torque arms for each of said axle housings, the longer part of each of said members being laterally opposite the shorter part of the other thereof, a secondary frame comprising side rails, motors and a swing bolster carried by said secondary frame, and journal springs residing both fore and aft of each of said journal bearing housings for springing said secondary frame from said main frame.

3. In a rail truck, a main frame comprising axle housings with journal bearing housings fixedly secured to the outer ends thereof and side rails each articulated along its length and each rigidly attached at its ends directly to said journal bearing housings, a secondary frame comprising side rails and cross members, means resiliently supporting said secondary frame from said main frame, a swing bolster swung from said last named side rails and a center bearing member carried by said swing bolster.

4. In a rail truck, a main frame comprising axle housings with journal bearing housings fixedly secured to the outer ends thereof and side rails articulated intermediate their ends and rigidly attached at their ends to said journal bearing housings, the points of articulation each providing for a slight amount of relative longitudinal movement of the parts of the side rails, and a secondary frame comprising side rails and supporting motors and a center bearing member, said secondary frame being resiliently supported from said main frame.

5. The combination as set forth in claim 4 wherein the medium for effecting the articulated connection is composed of rubber.

6. In a rail truck, a main frame comprising axles, housings for said axles, journal bearings for said axles, journal bearing housings fixedly secured to said axle housings, said axles being retained against free axial sliding movement therein and side rails articulated intermediate their ends and rigidly attached at their ends to said journal bearing housings, a secondary frame comprising side rails, a swing bolster swung from said side rails, and a center bearing member on the swing bolster, said secondary frame being sprung from said main frame in the vicinity of said journal bearings.

7. In a rail truck including axle housings, journal bearing housings rigid with the axle housings, torque arms rigid at each end with said journal bearing housings and articulated intermediate the ends thereof, a truck frame comprising side girders, cross members, motors and a center pin member, and journal springs supporting said frame from said journal bearing housings.

8. The combination as set forth in claim 7 wherein said journal springs are in pairs with one member of each pair residing fore and the other aft of its journal bearing housing, and supporting means for said springs rigid with their respective journal bearing housings and torque arms.

9. In a rail truck, two axles, a rigid assembly associated with each axle and carrying the bearings therefor, means spaced from said axles longitudinally of the truck for interconnecting said assemblies at a plurality of points lying on a line not parallel to said axles, said means being of such a nature as to allow slight movements of said assemblies towards and away from each other, a frame, and means for resiliently supporting said frame on each of said assemblies and for separately securing each of said assemblies against excessive horizontal movement with respect to said frame.

10. A rail truck as defined in claim 9 in which said last mentioned means comprises rubber lying between and secured to substantially vertical surfaces on said assemblies and said frame and resiliently supporting said frame in elastic shear.

11. A rail truck as defined in claim 9 in which said last mentioned means comprises rubber lying between and secured to substantially vertical concentric cylindrical surfaces on said assemblies and said frame and resiliently supporting said frame in shear.

12. A rail truck as defined in claim 9 in which said last mentioned means resiliently allows and cushions slight horizontal relative movements between said assemblies and said frame.

13. A rail truck having two axles, a rigid assembly associated with each axle and carrying the bearings therefor, means for applying a torque between at least one of said axles and its associated assembly, means spaced from said axles longitudinally of the truck for interconnecting said assemblies at a plurality of points lying on a line not parallel to said axles, said means being of such a nature as to allow slight movements of said assemblies towards and away from each other, a frame, and means for resiliently supporting said frame on each of said assemblies and for separately securing each of said assemblies against excessive horizontal movement with respect to said frame.

14. A rail truck as described in claim 13 in which the means for applying torque between at least one of said axles and its associated assembly comprises gearing carried by said axle and said assembly and a motor connected to said gearing.

15. A rail truck having a pair of spaced side girders rigidly connected together, a swing bolster having its ends under and supported from the central portions of said side girders, a pair of rigid axle-carrying assemblies one at each end of said truck, said assemblies having portions lying in the same vertical planes as said side girders, resilient means supporting said side girders on said portions of said assemblies, and a pair of torque arms each forming a part of one of said rigid assemblies, each of said torque arms extending along one side of the truck outside of the side girder at least at the center of the truck and extending past the center of the truck to a point at which it is connected to the other rigid assembly.

16. A rail truck as described in claim 15 in which the wheels lie outside of but closely adjacent said side girders and said resilient means.

17. A truck for a rail vehicle comprising wheels and axles, a main frame comprising axle housings and side rails extending between and beyond said axle housings, said side rails each being articulated between said axle housings and constituting torque arms, a secondary frame including a swing bolster, pairs of journal springs all carried by said side rails, one of the springs of each of said pairs being carried fore and one aft of each of said axles whereby said secondary frame is sprung from said main frame, said swing bolster having a center bearing member for receiving the loading for one end of a car body whereby said body moves with said secondary frame for vertical motions and moves with respect to said secondary frame for lateral motions.

18. A truck for a rail vehicle comprising wheels and axles, a main frame comprising axle housings and side rails extending between and beyond said axle housings, said side rails each being articulated between said axle housings and constituting torque arms, the articulation being such as to permit lengthening and shortening of said side rails, a secondary frame including a swing bolster, pairs of journal springs all carried by said side rails, one of the springs of each of said pairs being carried fore and one aft of each of said axles whereby said secondary frame is sprung from said main frame, said swing bolster having a center bearing member for receiving the loading of one end of a car body whereby said body moves with said secondary frame for vertical motions and moves with respect to said secondary frame for lateral motions.

19. A rail truck having two axles, an axle housing for each of said axles having journal bearing housings rigidly secured to the outer ends thereof, a member articulated intermediate its ends and rigidly connected to each of the journal bearing housings on each side of the truck to constitute torque arms and side rails of the main truck frame, the two parts of said members being of different lengths, the longer part of each of said members residing laterally opposite the shorter part of the other, a swing bolster, and means comprising a secondary frame supported from said torque arms for resiliently supporting said swing bolster on said journal bearing housings.

20. In a rail truck, axles, bearings for said axles, a pair of side frames connecting the bearings of said axles, each of said side frames being articulated intermediate the ends thereof by an element composed of elastic plastic material adapted to resist relative longitudinal movements of the frame parts by shear stresses, and cross-members rigidly connecting each of said frame parts with a frame part on the opposite side of the truck.

21. In a rail truck, axles, bearings for said axles, a pair of side frames connecting the bearings of said axles, each of said side frames being articulated intermediate the ends thereof by an element composed of elastic plastic material allowing small relative movements of the frame parts in any direction, and cross-members connecting each of said frame parts with a frame part on the opposite side of the truck.

22. In a rail truck, axles, bearings for said axles, a pair of side frames connecting the bearings of said axles, each of said side frames being articulated intermediate the ends thereof by an element composed of elastic plastic material allowing small relative movements of the frame parts in any direction, cross-members connecting each of said frame parts with a frame part on the opposite side of the truck, and a second frame unit sprung from said side frames and having a swing bolster supported thereby.

EMIL H. PIRON.